United States Patent
Steiner et al.

(10) Patent No.: US 10,065,582 B2
(45) Date of Patent: Sep. 4, 2018

(54) CABLE DUCT AND METHOD FOR PRODUCING A THREE-DIMENSIONAL CABLE DUCT

(71) Applicant: LEONI BORDNETZ-SYSTEME GMBH, Kitzingen (DE)

(72) Inventors: Peter Steiner, Burghaslach (DE); Peter Dohlus, Nuremberg (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 82 days.

(21) Appl. No.: 15/049,300

(22) Filed: Feb. 22, 2016

(65) Prior Publication Data

US 2016/0167603 A1     Jun. 16, 2016

Related U.S. Application Data

(63) Continuation of application No. PCT/EP2014/067598, filed on Aug. 18, 2014.

(30) Foreign Application Priority Data

Aug. 21, 2013   (DE) ........................ 10 2013 216 581

(51) Int. Cl.
    *B60R 16/02*     (2006.01)
    *B62D 65/00*     (2006.01)

(52) U.S. Cl.
    CPC .......... *B60R 16/0215* (2013.01); *B62D 65/00* (2013.01)

(58) Field of Classification Search
    CPC ........................... B60R 16/0215; B62D 65/00
    USPC ............... 138/108, 106, 110, 113, 155, 177, 138/DIG. 11, 162, 166, 169
    See application file for complete search history.

(56) References Cited

U.S. PATENT DOCUMENTS

| 3,441,975 A | 5/1969 | Shepherd |
| 4,891,471 A * | 1/1990 | Ono ..................... H02G 3/0608 138/166 |
| 6,878,879 B2 * | 4/2005 | Takahashi ............ H02G 3/0418 174/68.3 |
| 7,600,719 B2 | 10/2009 | Wehler et al. |
| 7,825,339 B2 | 11/2010 | Suzuki |

(Continued)

FOREIGN PATENT DOCUMENTS

| CN | 1630972 A | 6/2005 |
| DE | 3820263 A1 | 1/1989 |

(Continued)

*Primary Examiner* — John K Fristoe, Jr.
*Assistant Examiner* — David Deal
(74) *Attorney, Agent, or Firm* — Laurence A. Greenberg; Werner H. Stemer; Ralph E. Locher

(57) ABSTRACT

A cable duct has a cable floor with side walls that are attached to the cable floor. The cable floor has a three-dimensional laying structure, running inside a base plane and also in a z-direction, and it is divided into several floor segments. The segments form a combined injection-molded component and are joined together by hinges, so that at least a major portion of all floor segments is located in the base plane. In addition, cover segments preferably form part of the combined injection-molded component, such that, by way of just one injection molding tool, the entire three-dimensional cable duct can be produced as a two-dimensional injection-molded component, from which the three-dimensional structure of the cable duct is produced.

13 Claims, 2 Drawing Sheets

(56) References Cited

U.S. PATENT DOCUMENTS

| | | |
|---|---|---|
| 2003/0207602 A1 | 11/2003 | Handler |
| 2007/0181336 A1 | 8/2007 | Lipp et al. |
| 2009/0211781 A1 | 8/2009 | Suzuki |
| 2009/0212172 A1 | 8/2009 | Kurth |

FOREIGN PATENT DOCUMENTS

| | | |
|---|---|---|
| DE | 9012948 U1 | 11/1990 |
| DE | 9412641 U1 | 11/1994 |
| DE | 102004013010 B3 | 11/2005 |
| DE | 102005046194 A1 | 4/2007 |
| EP | 0696097 B1 | 3/1999 |
| EP | 1026802 A1 | 8/2000 |
| GB | 2206455 A | 1/1989 |
| JP | H10313519 A | 11/1998 |
| JP | 2009027885 A | 2/2009 |
| JP | 5189844 B2 | 4/2013 |
| WO | 2008041377 A1 | 4/2008 |

\* cited by examiner

CABLE DUCT AND METHOD FOR PRODUCING A THREE-DIMENSIONAL CABLE DUCT

CROSS-REFERENCE TO RELATED APPLICATION

This application is a continuation, under 35 U.S.C. § 120, of copending international application No. PCT/EP2014/067598, filed Aug. 18, 2014, which designated the United States; this application also claims the priority, under 35 U.S.C. § 119, of German patent application No. DE 10 201 3 216 581.1, filed Aug. 21, 2013; the prior applications are herewith incorporated by reference in their entirety.

BACKGROUND OF THE INVENTION

Field of the Invention

The invention relates to a cable duct having a three-dimensional laying structure and to a method for producing a three-dimensional cable duct of this kind.

The terms "three-dimensional cable ducts" or "cable ducts having a three-dimensional laying structure" should be understood as cable ducts whose duct floor, which is delimiting on the bottom side, extends—in the running direction in the cable longitudinal direction—not only within a plane, but spreads out in three spatial directions, i.e. extends out of a base plane also in a third spatial direction, hereinafter referred to as the z-direction. Cable ducts of this type are used in the automotive industry, for instance, to guide lines or cable harnesses around built-in components.

These three-dimensional cable ducts are usually constituted by closed cable ducts, which thus are closed off with a duct cover, which usually runs parallel to the duct floor. The exact course of the cable duct is here basically dependent on the chosen location in the vehicle. The duct floor is laterally adjoined by side walls. These form jointly with the duct floor, viewed in cross section perpendicular to a duct longitudinal direction, a roughly U-shaped component. For assembly, the duct floor is connected to the duct cover, for instance via snap fastenings. Due to the three-dimensional laying structure, the production costs for specific components of this type are very high. Thus complex tools must be provided, to be precise respectively for the duct floor and also for the duct cover.

SUMMARY OF THE INVENTION

It is accordingly an object of the invention to provide a cable duct and a method for producing a three-dimensional cable duct which overcome the above-mentioned and other disadvantages of the heretofore-known devices and methods of this general type and which provide for a cable duct that can be produced cost-effectively. In addition, the object of the invention is to define a cost-effective method for producing a three-dimensional cable duct of this type.

With the foregoing and other objects in view there is provided, in accordance with the invention, a cable duct, comprising:

a duct floor formed with side walls, said duct floor having a three-dimensional laying structure and running within a base plane and additionally in a z-direction;

said duct floor being divided into a plurality of floor segments, said floor segments forming a common injection-molded component and being hinged to one another, enabling all of said floor segments to be unfolded at least substantially into said base plane.

With the above and other objects in view there is also provided, in accordance with the invention, a method of producing a three-dimensionally running cable duct having a duct floor and having side walls adjoining said duct floor. The method comprising:

in a first step, producing an unfolded duct floor with the aid of a mold, the duct floor being formed of a plurality of floor segments that run substantially within a base plane and that are hinge-connected to one another via hinge joints; and in a second step, angling the floor segments off from one another at the hinge joints to form a three-dimensional course of the cable duct.

In addition, the first step may comprise fully producing, with the aid of the single mold or single molding tool, the cable duct with a duct cover in the form of an unfolded cable duct In other words, the cable duct has a three-dimensional laying structure, i.e. comprises a duct floor which spreads out in three spatial directions. It comprises a bottom side and side walls, wherein the course of the bottom side and thus of the duct floor is three-dimensional, thus extends within a base plane and extends additionally into a Z-plane. The duct floor is divided into a plurality of floor segments, which in the end state are oriented in the z-direction at an angle to one another. At least one of the floor segments thus protrudes from the base plane and extends in the z-direction and is arranged, in the mounted end state, at an angle to an adjacent floor segment. The floor segments here form a common injection molded component and are connected to one another in a hinge-like manner (i.e., hinge-connected, hinged), so that all floor segments can be locked at least substantially into the base plane.

This embodiment derives from the basic notion of unfolding the three-dimensional course of the duct floor into one plane, i.e. the duct floor is divided into the various floor segments, which are not connected to one another in a hinge-like manner and do not form an inherently rigid component. In the production of this unfolded duct floor, which consists of a plurality of interconnected floor segments, a comparatively simple mold is therefore sufficient in comparison to the production of a duct floor, since the injection molded component to be produced extends merely within one plane. For the configuration of the three-dimensional course of the cable duct, the floor segments subsequently need merely to be angled off from one another and to be brought into the desired three-dimensional structure.

By the term "can be locked at least substantially into the base plane" is herein understood that, in the unfolded state, the bottom sides of all floor segments lie within a common plane, namely the base plane, or extend only slightly out of this base plane in the z-direction. Any extent in the z-direction of the individual bottom sides is preferably limited to preferably the single height, if need be twice the height of the side walls, and amounts to no more than around 20%, preferably 10%, of the height in the z-direction of the end-mounted, three-dimensional duct. This extent in the z-direction is of advantage, for instance, when the duct floor does not extend exclusively linearly, but is also composed of curved sections, which, upon unfolding, necessarily have a certain extent in the z-direction.

Expediently, the floor segments which are mutually adjoining in a duct longitudinal direction are connected to one another via film hinges. This is particularly simple in a production engineering respect, since, to this end, a constriction has merely to be made in the mold. These film hinges here expediently extend over the entire width of the duct.

The floor segments are here preferably arranged such that they are movable relative to one another. According to this design variant, for the assembly end state no fixing of the cable duct in the three-dimensional course is therefore provided. According to an alternative preferred embodiment, the individual floor segments are mechanically fixed together, so that the assembly end state forms an inherently rigid component with three-dimensional course or laying structure.

In a preferred embodiment, the side walls are formed by first side parts, which are respectively molded onto a respective floor segment. The side parts therefore form with the floor segments in total the common injection molded part. The side parts here protrude regularly in the transverse direction to the duct longitudinal direction at an angle to the floor segments, in particular at a right angle. Viewed in cross section, each floor segment is therefore configured in total roughly in a U-shape.

Preferably, the duct floor comprises at least one curved region extending in the z-direction, which selectively forms an inherent further floor segment or is at least part of another floor segment. As a result of these measures, also curved sections are at least largely unfolded into the base plane.

Preferably, the cable duct is additionally configured with a duct cover, which is connected to the side walls via connecting elements. This is therefore constituted by a closed cable duct, which has end-face openings merely in a duct longitudinal direction or direction of extent. These connecting elements are here preferably configured as latching and snap-fastening elements, so that a simple, tool-free closure of the cable duct during assembly is enabled.

The duct cover is configured—corresponding to the duct floor—in three-dimensional design, and therefore likewise extends in three spatial directions. Correspondingly to the duct floor, the duct cover is also preferably divided into a plurality of cover segments, which in the mounted end state are oriented at an angle to one another in the z-direction. The cover segments are here, in turn, part of a common injection molded component, or form one such, and can be unfolded at least substantially into the base plane. The duct cover too is therefore produced by a merely two-dimensional injection mold, which in comparison to a three-dimensional mold is significantly simpler. For assembly, the individual cover segments are again easily angled-off from one another in order to form the desired three-dimensional laying structure. The individual cover segments are thus, in turn, at least indirectly connected to one another in a hinge-like manner.

In a particularly preferred embodiment, the cover segments here form jointly with the floor segments the one-piece common injection molded component. The individual segments are hinge-connected or hinged to one another. All segments of the cable duct can therefore be unfolded substantially into the base plane. This yields the particular advantage that merely a single mold is required in order to form a closed cable duct with three-dimensional laying structure. In comparison to the prior art, according to which two separate molds are necessary, a considerable cost saving is thereby obtained.

Expediently, each individual cover segment is fastened in a hinge-like manner to the side of a thereto assigned floor segment, in particular via a film hinge.

Preferably, the cover segments are here connected to the floor segments via connecting links. Via these connecting links, an improved pivotal mobility is achieved in order to be able to pivot the respective cover segment over the associated floor segment.

Expediently, second side parts are respectively molded onto the cover segments, so that the cover segments form with the side parts in cross section a U-shaped component. In an expedient refinement, the side parts of the cover segment are connected to those of the associated floor segment via the connecting elements.

In accordance with an advantageous feature of the invention, the individual segments expediently have in some sections reduced wall thicknesses or material cutouts. In the latter case, the surface of the cable duct is interrupted by clearances. In total, the cable duct is preferably configured in a roughly netlike manner with stability-defining struts and regions of reduced wall thickness in-between, or with apertures, or with perforations throughout. As a result, the basic stability is fundamentally not, or only insignificantly influenced. At the same time, the necessary material usage is lowered, which leads particularly advantageously to weight and cost savings. Preference is for the variant comprising the varying wall thicknesses instead of a complete material aperture. In regions in which no mechanical stability requirements exist, the wall thickness is reduced to a minimum. This is of advantage when a closed surface is necessary or desired and can also be realized more easily in a mold technology respect.

Other features which are considered as characteristic for the invention are set forth in the appended claims.

Although the invention is illustrated and described herein as embodied in a cable duct and a method for producing a three-dimensional cable duct, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

In the figures, same-acting and functionally equivalent parts are provided with the same reference symbols.

DETAILED DESCRIPTION OF THE INVENTION

Figure 1:
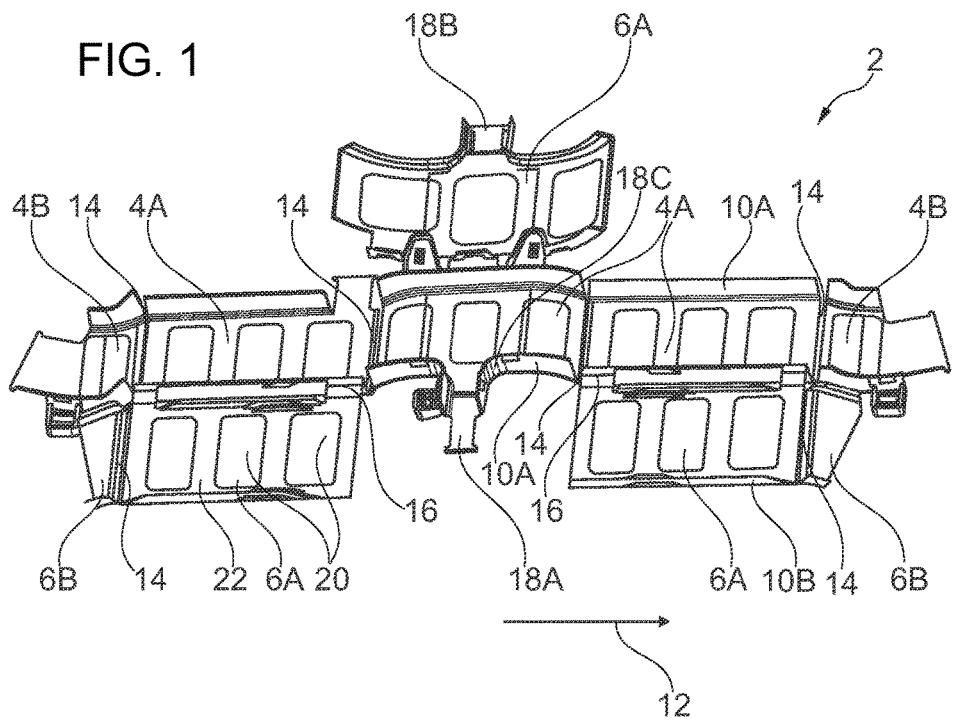
FIG. 1 shows in a perspective view an unfolded injection molded part with floor segments and cover segments linked to one another in a hinge-like manner.
Figure 2:
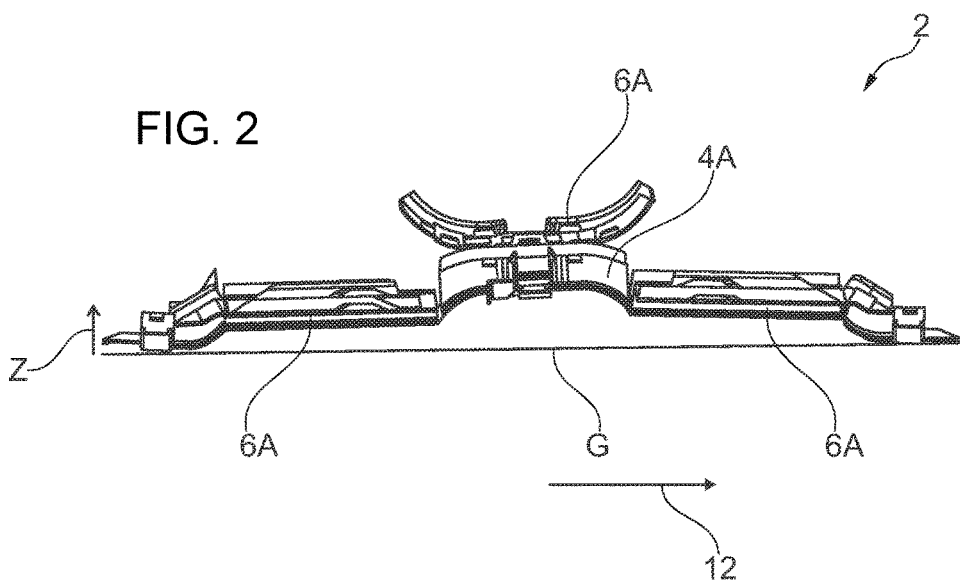
FIG. 2 shows the injection molded component according to FIG. 1 in a side view.

Referring now to the figures of the drawing in detail and first, particularly, to FIGS. 1 and 2 thereof, there is shown an unfolded injection molded part 2, which has a plurality of segments articulately fastened to one another, namely floor segments 4A, 4B and cover segments 6A, 6B. This injection molded part 2 is produced with just one mold in a single injection molding step. From this injection molded part 2 is next formed in a second step, by unfolding of the individual segments 4A, 4B, 6A, 6B, a cable duct 8, which assumes the three-dimensional course represented in FIG. 3.

Figure 3:
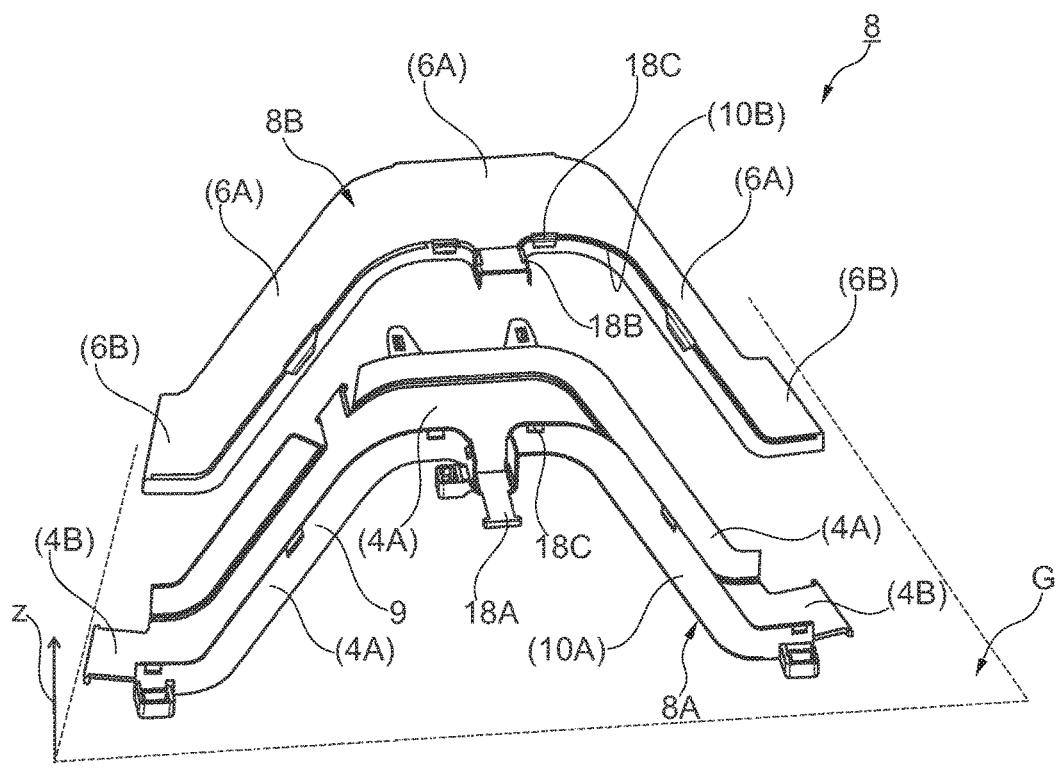
FIG. 3 shows a conventional cable duct having a three-dimensional laying structure with separate duct floor and duct cover, which laying structure is shown in the style of an exploded representation.

FIG. 3 illustrates an exploded representation of a conventional cable duct 8 formed of a top part and a bottom part separate therefrom. This cable duct therefore comprises in general terms a duct floor 8A, forming the bottom part, and a duct cover 8B, forming the top part. The duct floor 8A has laterally formed-on side walls 9. This cable duct 8 is identically reproduced by the common injection molded part 2. The injection molded part 2 according to FIGS. 1 and 2 therefore corresponds to an unfolding of the cable duct 8. From the unfolded injection molded part 2, the three dimensional course structure of the cable duct 8 is formed by angling-off of the individual segments 4A, 4B, 6A, 6B from one another in the mounted end position.

By three-dimensional laying structure or three-dimensional course is herein understood, in general terms, not only that an extent vector, which defines the spread direction of the cable duct 8, i.e. the longitudinal direction thereof, runs within a plane which is hereinafter denoted as the base plane G, but that this extent vector is also oriented in a third direction, namely the z-direction, which protrudes from the base plane G.

As is represented with reference to FIGS. 1 and 2, this three-dimensional course structure is unfolded in total at least substantially into the base plane G, so that in the initial stage a substantially two-dimensional shaping of the injection molded part 2 is created. By substantially two-dimensional is herein understood that the bottom sides of the individual floor segments 4A,4B, and the top-facing sides of the cover segments 6A,6B, except for possibly curved sections, run at least substantially within the base plane G and protrude in the z-direction at most slightly over the base plane G, for instance maximally up to the single or double height of the side walls 9.

In the illustrative embodiment, a middle floor segment 4A is adjoined on both sides in the duct longitudinal direction 12 by a further lateral floor segment 4A respectively attached via a film hinge 14. Via further film hinges 14, these lateral floor segments 4A are respectively adjoined by a further, curved floor segment 4B. For the sake of better comparability, the individual segment regions, including in the three dimensional structure represented in FIG. 3, are represented with bracketed reference symbols.

Correspondingly to the main floor segments 4A extending at least in some areas in a straight line, the injection molded part 2 has main cover segments 6A likewise extending at least in some areas in a straight line. These are mutually fastened in the duct longitudinal direction, however, not directly one to another, but merely at a floor segment 4A respectively assigned to them. Viewed in the duct longitudinal direction 12, they are in this case placed alternately on different sides of the floor segments 4A. The cover segments 6A are herein connected to the respective floor segments 4A,4B via connecting links 16.

Correspondingly to the curved wide floor segments 4B, further cover segments 6B, which likewise have at least one curved portion, are also molded onto the marginal cover segments 6A. These further cover segments 6B are articulately fastened via film hinges 14 to the main cover segments 6A. As can further be seen in particular also from the side view according to FIG. 2, the middle main segments 4A,6A are respectively configured curved toward the marginal side.

Onto each of the segments 4A, 4B; 6A, 6B are respectively formed side parts 10A,10B, namely onto the floor segments 4A,B first side parts 10A and onto the cover segments 6A,B second side parts 10B. These usually extend at right angles to the floor and to the cover surface respectively. The floor segments 4A,B form together with the side parts 10A respectively U-shaped components. By contrast, on the main cover segments 6A is configured, on one side only, a side part 10B, to be precise on the marginal side lying opposite the connecting links 16. Only in the case of the middle cover segment 6A are side parts 10B configured on both sides.

On the mutually corresponding side parts 10A,10B are preferably configured connecting elements 18, which are configured in the style of links 18A, link receptacles 18B or latching elements 18C.

For the production of the injection molded part 2, only a single mold having a negative form corresponding to the injection molded component 2 is used. This mold has, in particular, two mold halves, the parting plane of which preferably runs at least approximately along the base plane G. The injection molding process is effected in standard manner, in that the injection material, usually plastic, is introduced in viscous form and subsequently cured.

Following production of the injection molded part represented in FIGS. 1 and 2, the individual segments 4A,4B, 6A,6B are angled off from one another and brought into the three-dimensional laying structure represented in FIG. 3. The cover segments 6A,6B are pivoted over the respectively associated floor segment 4A,4B and next the individual segments 4A,4B,6A,6B are mutually fastened to one another via the connecting elements 18A,B,C, so that the cable duct 8 having the three-dimensional course structure is obtained.

As can, in particular, further be seen from FIG. 1, both the floor segments 4A,B and the cover segments 6A respectively have a plurality of sections 20 with reduced wall thickness, whereby both the material usage and weight is reduced. In the illustrative embodiment, the sections 20 are formed by large-area surface regions, which are delimited from one another by webs 22. In the illustrative embodiment, the sections 20 are of roughly rectangular configuration and extend over broadly the entire duct width between the side parts 10A, 10B.

The following is a summary list of reference numerals and the corresponding structure used in the above description of the invention:

2 injection molded part
4A,B floor segment
6A,B cover segment
8 cable duct
8A duct floor
8B duct cover
9 side wall
10A,B side part
12 duct longitudinal direction
14 film hinge
16 connecting link
18A link
18B latching element
20 section
22 webs
G base plane

The invention claimed is:

1. A cable duct extending in a duct longitudinal direction, comprising:
  a duct floor formed with side walls, said duct floor having
    a three-dimensional laying structure and extending within a base plane and additionally in a z-direction;
  said duct floor being divided into a plurality of floor segments, said floor segments forming a common injection-molded component and being hinged to one another at hinge positions along the duct longitudinal direction, enabling all of said floor segments to be unfolded at least substantially into said base plane;

said side walls being formed by first side parts molded onto respective ones of said plurality of floor segments for defining a substantially U-shaped cross-section of said plurality of floor segments;

a duct cover and connecting elements connecting said duct cover to said side walls, said duct cover having a three-dimensional laying structure corresponding to said duct floor, and said duct cover being divided into a plurality of cover segments, which are at least indirectly mutually hinge-connected to one another and unfoldable at least substantially into said base plane.

2. The cable duct according to claim 1, wherein said floor segments are connected to one another via film hinges.

3. The cable duct according to claim 1, wherein said floor segments are movable relative to one another.

4. The cable duct according to claim 1, wherein said duct floor has at least one curved region extending in the z-direction, which selectively forms a further floor segment or which is at least part of one of said floor segments.

5. The cable duct according to claim 1, wherein said connecting elements are selected from the group consisting of links, link receptacles, and latching elements.

6. The cable duct according to claim 1, wherein said cover segments and said floor segments jointly form said injection-molded component.

7. The cable duct according to claim 1, wherein said cover segments are connected to said floor segments via connecting links.

8. The cable duct according to claim 1, which comprises second side parts respectively molded onto said cover segments, wherein said second side parts are connected to said first side parts.

9. The cable duct according to claim 1, wherein individual said floor segments and cover segments are formed in some sections with reduced wall thicknesses or material cutouts.

10. The cable duct according to claim 1, wherein individual said floor segments and cover segments are formed in sections with reduced wall thicknesses or material cutouts, the cable duct is constructed in a substantially netlike manner with stability defining struts and regions of reduced wall thickness or with aperture in between.

11. The cable duct according to claim 10, wherein said regions of reduced wall thickness are defined by large-area surface regions delimited from one another by webs and each of said floor segments have a plurality of said regions of reduced wall thickness or with apertures, said plurality of said regions of reduced wall thickness or with apertures are distributed over a total length of each of said floor segments in the duct longitudinal direction.

12. A method of producing a three-dimensionally cable duct extending in a duct longitudinal direction and having a duct floor and having side walls adjoining said duct floor, the method comprising:

in a first step, producing an unfolded duct floor with the aid of a mold, the duct floor being formed of a plurality of floor segments that extend substantially within a base plane and that are hinge-connected to one another via hinge joints at hinge positions along the duct longitudinal direction and forming the side walls by first side parts molded onto respective ones of the plurality of floor segments for defining a substantially U-shaped cross-section of the plurality of floor segments, and forming a duct cover and connecting elements connecting said duct cover to the side walls, the duct cover having a three-dimensional laying structure corresponding to the duct floor, and the duct cover being divided into a plurality of cover segments, which are at least indirectly mutually hinge-connected to one another and unfoldable at least substantially into the base plane; and in a second step, angling the floor segments off from one another at the hinge joints to form a three-dimensional course of the cable duct.

13. The method according to claim 12, wherein the first step comprises fully producing, with the aid of the one mold, the cable duct with a duct cover in the form of an unfolded cable duct.

* * * * *